US007913651B1

(12) United States Patent
Schiebout

(10) Patent No.: US 7,913,651 B1
(45) Date of Patent: Mar. 29, 2011

(54) MODULAR ANIMAL AND GEAR CONTAINMENT AND TRANSPORT SYSTEM

(76) Inventor: Daniel Schiebout, Orange City, IA (US)

( * ) Notice: Subject to any disclaimer, the term of this patent is extended or adjusted under 35 U.S.C. 154(b) by 129 days.

(21) Appl. No.: 12/229,462

(22) Filed: Aug. 22, 2008

(51) Int. Cl.
*A01K 1/00* (2006.01)
(52) U.S. Cl. ........ 119/496; 119/482; 119/847; 296/37.1
(58) Field of Classification Search .................. 119/453,
119/482, 496, 771, 488, 454, 472, 480, 473,
119/500, 415, 407, 400, 847; 296/26.09,
296/37.6, 24.31
See application file for complete search history.

(56) References Cited

U.S. PATENT DOCUMENTS

| | | | | |
|---|---|---|---|---|
| 2,897,781 | A * | 8/1959 | Olson | 119/496 |
| 4,546,728 | A * | 10/1985 | May | 119/496 |
| 5,349,924 | A * | 9/1994 | Hooper, Jr. | 119/496 |
| 5,706,761 | A * | 1/1998 | Mayer | 119/475 |
| 5,887,928 | A * | 3/1999 | Fenske | 296/24.31 |
| 6,250,529 | B1 * | 6/2001 | Babbitt et al. | 224/401 |
| 6,647,925 | B1 * | 11/2003 | Waiters | 119/494 |
| 7,083,219 | B1 * | 8/2006 | Gregory | 296/100.12 |
| 2004/0134444 | A1 * | 7/2004 | Shiever et al. | 119/496 |
| 2007/0158968 | A1 * | 7/2007 | Chandler et al. | 296/37.6 |

\* cited by examiner

*Primary Examiner* — Rob Swiatek
*Assistant Examiner* — Joshua Huson
(74) *Attorney, Agent, or Firm* — Jeffrey A. Proehl; Woods, Fuller, Shultz & Smith, PC

(57) ABSTRACT

An animal and gear transportation system for positioning in a cargo space of a vehicle is disclosed. The system may comprise a kennel module including a base portion mountable on a bed of the cargo space, and the base portion is elongate with opposite ends. The kennel module may include a containment portion defining an interior capable of receiving an animal, with the containment portion being mounted on the base portion and being elongate with opposite ends and sides extending between the ends. The containment portion may be slidable with respect to the base portion such that the containment portion is movable between a retracted position in which the containment portion is substantially fully positioned over the base portion, and an extended position in which the containment portion is at partially cantilevered with respect to the base portion.

27 Claims, 12 Drawing Sheets

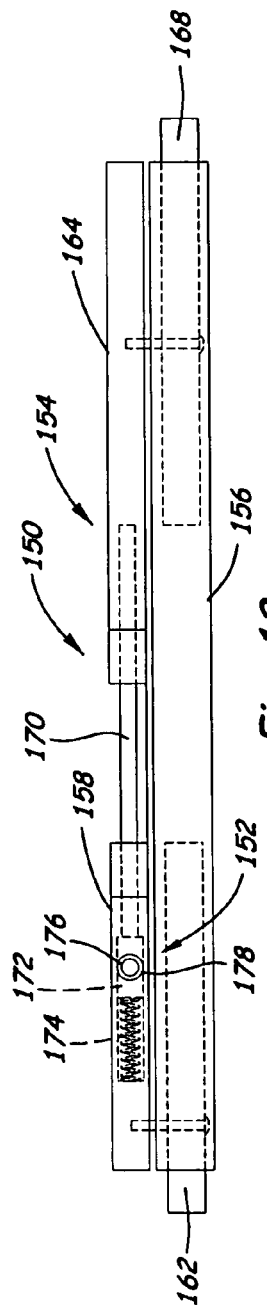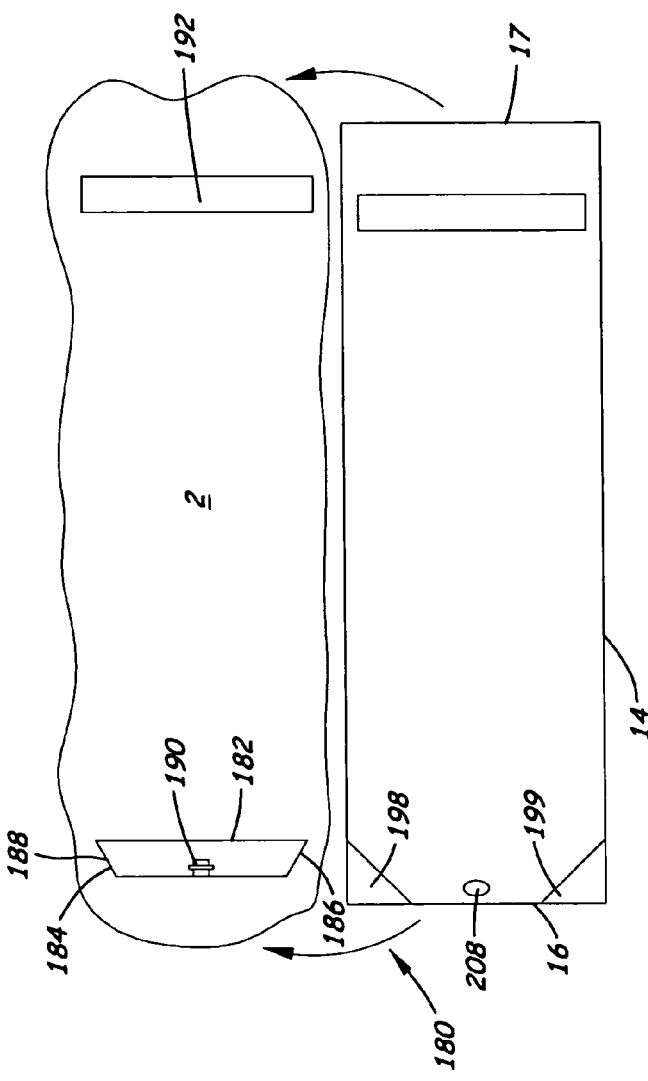

MODULAR ANIMAL AND GEAR CONTAINMENT AND TRANSPORT SYSTEM

BACKGROUND

1. Field

The present disclosure relates to animal transport containers, and more particularly pertains to a new modular system for transporting animals and gear in the cargo space of a vehicle.

2. Description of the Prior Art

It is common for people such as hunters, sportsmen and sportswomen, and other animal owners to transport their animals in vehicles, especially if the person uses the animal for hunting. When hunting, the person will often have additional gear for care of the animal as well as for conducting the hunt. For the comfort of the animal, as well as to accommodate the gear, it is not uncommon to utilize a pickup truck with an open bed (or a bed that is enclosed topper or cap) or a sport utility vehicle with a large open space in the rear. While this can be convenient, the animals and gear need to be secured during movement of the vehicle, and various apparatus have been devised to provide the securement.

However, the known apparatus are believed to be unnecessarily difficult to use, since the securing of the apparatus in the cargo space can also make the apparatus difficult to access, and thus difficult to load with and animal and gear. Furthermore, it is not uncommon that a person that has one hunting dog will also have a second hunting dog, or will desire to hunt along with someone who also has a hunting dog, so it is not uncommon that two or more hunting dogs and the associated hunting gear will need to be transported in the same vehicle. This can produce difficulty in the efficient use of the cargo space available, and complicate the otherwise already difficult loading and unloading process.

Known animal transport containers, such as portable kennels, tend to be small and useful for only a single animal. These containers often lacks any provision for carrying the gear that may be needed for use with the animal, such as food, water, and the like, not to mention hunting gear (if that is the purpose of transporting the animal). The known containers can also be difficult to move in and out of the vehicle to release the animal, and are typically not well configured to fit the cargo space of a vehicle in an efficient manner.

It is therefore believed that there is a need for a more space efficient and easy to use alternative to the known animal and cargo transporting apparatus.

SUMMARY

In view of the foregoing disadvantages inherent in the known animal transport containers, the present disclosure describes a new modular system which may be utilized for transporting animals and gear in the cargo space of a vehicle.

The present disclosure relates to a new animal and gear transportation system for positioning in a cargo space of a vehicle. The system is restable on a bed of the cargo space, and comprises a kennel module. The kennel module may include a base portion mountable on a bed of the cargo space and being elongate with opposite ends. The kennel portion may further include a containment portion that defines an interior capable of receiving an animal. The containment portion may be mounted on the base portion. The containment portion may be elongate with opposite ends and sides extending between the ends. The containment portion may be slidable with respect to the base portion such that the containment portion is movable between a retracted position in which the containment portion is substantially fully positioned over the base portion, and an extended position in which the containment portion is at least partially cantilevered with respect to the base portion.

The foregoing is a general outline of some of the more significant aspects of the disclosure, and the detailed description of this application that follows discloses additional features of the disclosure which form the subject matter of the claims appended hereto.

The advantages of the various embodiments of the present disclosure, along with the various features of novelty that characterize the embodiments, are disclosed in the following descriptive matter and accompanying drawings.

BRIEF DESCRIPTION OF THE DRAWINGS

The disclosure will be better understood when consideration is given to the following detailed description thereof. Such description makes reference to the annexed drawings wherein:

FIG. 6 is a schematic sectional view of the braking assembly, according to an illustrative embodiment.

FIG. 9 is a schematic perspective view of the glide storage module, according to an illustrative embodiment.

FIG. 12 is a schematic end view of the door of the containment portion showing the latching assembly of FIG. 11.

FIG. 13 is a schematic view of a portion of a bed of a cargo space and a module in an inverted condition to showing the cooperating elements of the securing assembly.

DESCRIPTION OF PREFERRED EMBODIMENTS

Figure 1:
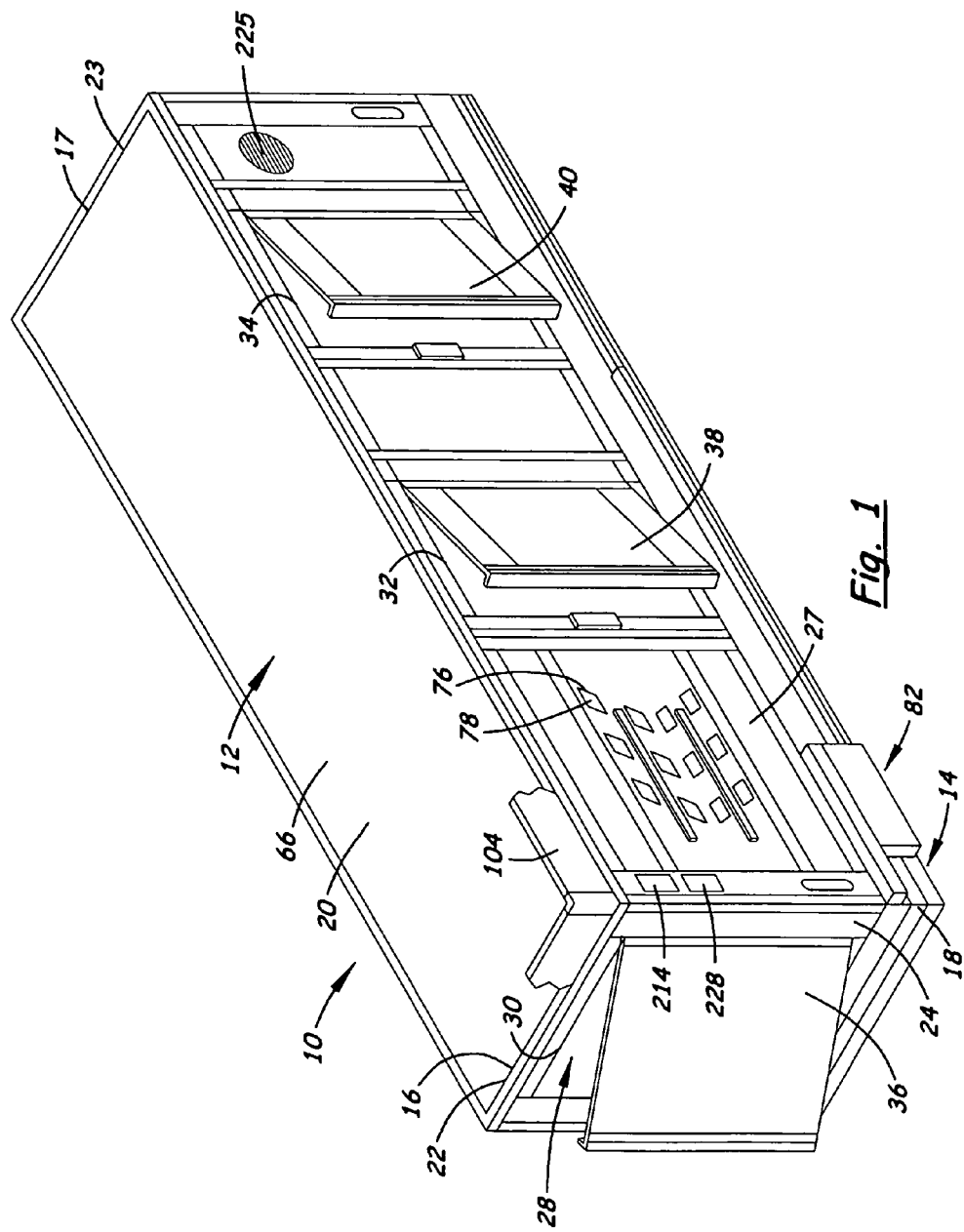
FIG. 1 is a schematic perspective view of a new kennel module according to the present disclosure.

With reference now to the drawings, and in particular to FIGS. 1 through 18 thereof, the modular system for transporting animals and gear of the present disclosure is generally designated by the reference numeral 10 in this description.

The disclosure is directed to an animal and gear transportation system 10 that is highly suitable for positioning in a cargo space of a vehicle, such as the cargo bed of a pickup truck or the enclosed cargo area of a sport utility vehicle, although the system 10 may be suitably utilized in other applications.

In one aspect, the system 10 may comprise a kennel module 12 that is useful for housing and transporting animals such as dogs. The kennel module 12 may include a base portion 14 for resting or mounting on a bed or floor of the cargo space of the vehicle and a containment portion 20 for containing or holding the animal or gear. The base portion 14 may be elongate with opposite ends 16, 17, and may define a track 18 on its top or upper surface that extends in a longitudinal direction of the base portion.

The containment portion 20 may be mounted on the base portion 14. The containment portion 20 may be elongated in dimension and shape similar to the base portion 14, with opposite ends 22, 23 and sides that extend between the ends. The containment portion 20 may comprise a pair of end walls 24, 25 and a pair of side walls 26, 27. The side walls 26, 27 may each extend between the end walls to define an interior 28.

A first opening 30 into the interior 28 of the containment portion 20 may be located in a first end wall 24 for permitting access to the interior and permit animals and/or gear to be moved into and out of the interior. In some embodiments, a second opening 32 may be located in the first side wall 26 and provides a second point of access into the interior 28 of the containment portion, particularly where the interior of the containment portions is divided into more than one compartment. In some further embodiments, a third opening 34 may be included to provide a third point of access to the interior 28 which may be particularly useful where a third animal is to be carried in the interior. The third opening 34 may be located in one of the side walls, and is preferably but not critically located in the first side wall 26 in a spaced relationship from the second opening. It will be recognized that only one opening in needed, and that containment portions may be suitably enlarged to provide interior space for additional compartments to hold more than one animal.

A first door 36 may be mounted on the containment portion 20 to selectively close the first opening 30, and may selectively cover or close the first opening 30. The first door 36 may be movable between an open position in which the door does not cover the opening 30, and a closed position in which the door covers the opening. In various embodiments, the first door 36 may be mounted on one of the walls of the compartment portion, such as, for example, the first end wall 24. The first door 36 may be pivotable about a substantially vertical axis. It will be recognized by those skilled in the art that the door may be moved in other ways including, for example, and when suitable, by pivoting about a horizontal axis and by sliding.

In embodiments including the second opening 32, the containment portion 20 may also include a second door 38 mounted on one of the walls of the compartment portion. In the illustrative embodiment, as well as other embodiments, the second door 38 is mounted on the first side wall 26 and is configured to selectively close the second opening 32. The second door 38 is also movable between an open position and a closed position, and may also be pivotally mounted on the first side wall 26 but could be mounted in other ways. Similar to the first door 36, the second door 38 may also be pivotable about a substantially vertical axis.

In embodiments in which the containment portion includes the third opening 34, a third door 40 may be mounted on the first side wall 26 and may be movable, such as by pivoting or by sliding, into a position that closes the second opening 32. The third door 40 may also be pivotable about a substantially vertical axis. In various embodiments, the third opening 34 and the corresponding third door 40 are between the second opening 32 and door 38 and the second end 23 of the containment portion.

Figure 4:
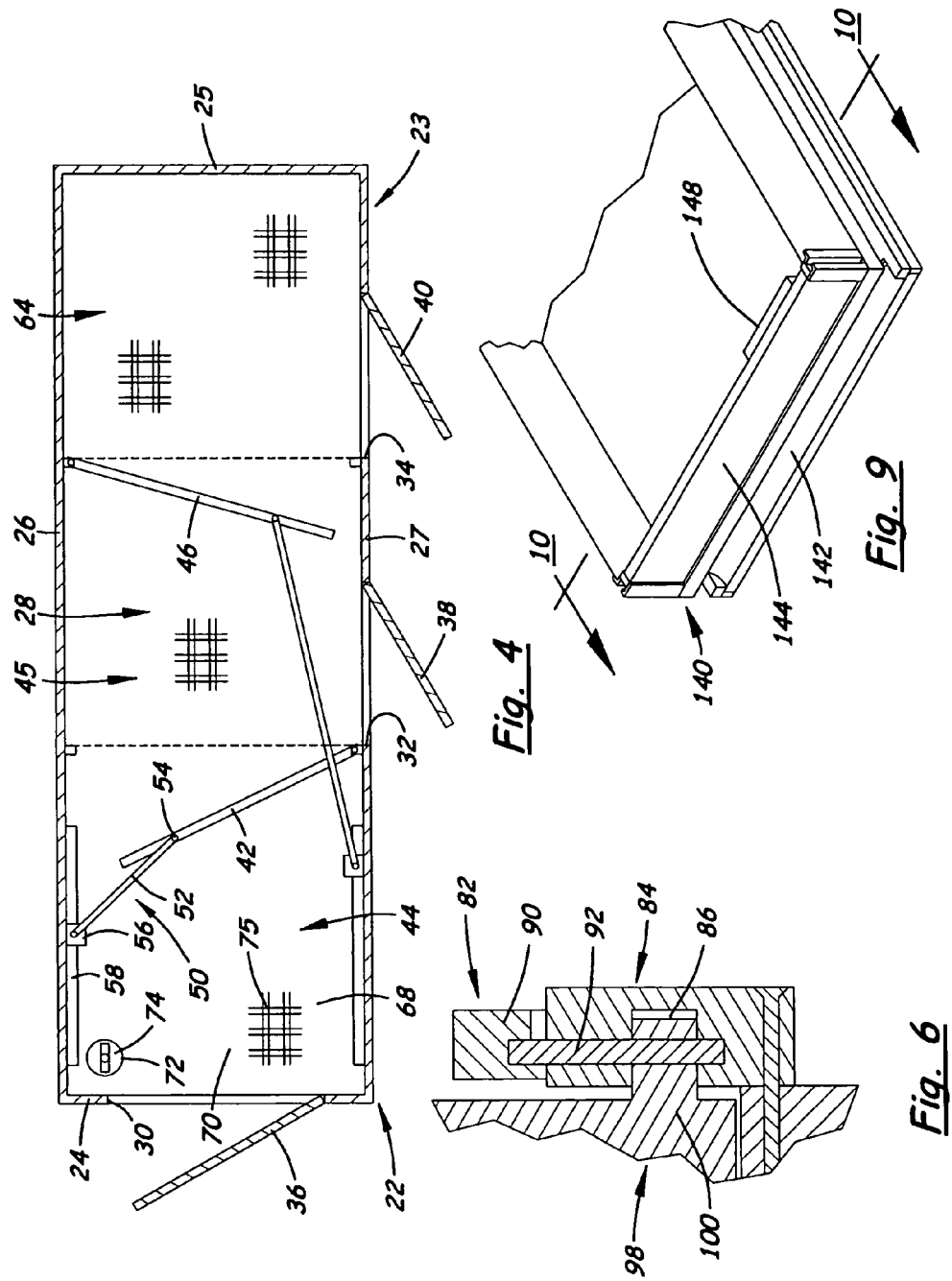
FIG. 4 is a schematic plan sectional view of the containment portion, according to an illustrative embodiment.

In those embodiments of the containment portion that are intended to include more than one compartment in the interior 28, a first interior divider 42 may be located in the interior 28 and may be configured to selectively define at least two compartments, for example a first compartment 44 between the first interior divider 42 and the first end 22 of the containment portion, and a second compartment 45 located between the first interior divider and the second end 23 of the containment portion. In various embodiments, the first interior divider 42 is movable between a closed position in which the compartments are substantially isolated from each other, and an open position that permits movement between the compartments 44, 45 on either side of the divider. The movement of the first interior divider may be a pivot movement, although again other types of movement may be utilized. The pivoting of the divider 42 may be about a substantially vertical axis. In the closed position, the first interior divider may extend between the side walls 26, 27 and may be oriented substantially perpendicular to those side walls. FIG. 4 shows the first interior divider in a partially open position. In some embodiments, the first interior divider 42 may be spaced from an upper interior surface 48 to create an air passage around the divider 42 when the divider is in the closed position.

A first divider actuator assembly 50 may be provided to move the first interior divider 42 between the open and closed positions (see FIG. 4). The actuation assembly 50 preferably provides the user with the ability to open and close the first interior divider from the first end 22 by reaching through the first opening 30. In the illustrative embodiment, the first divider actuator assembly 50 generally comprises an actuating rod 52, a first rod mount 54 mounted on the first interior divider 42, and a second rod mount 56 slidable with respect to one of the side walls of the containment portion. In greater detail, a first end of the actuating rod 52 may be mounted on the first rod mount 54, and the actuating rod may be pivotable with respect to the first rod mount. A second end of the actuating rod 52 may be mounted to the second rod mount 56, and the second rod mount may be mounted on a track 58 that is mounted on one of the side walls of the containment portion. The second rod mount 56 may be slidable with respect to the track 58. The second rod mount 56 may be lockable in at least one position with respect to the track 58, with one of the positions of the mount 56 corresponding to the closed position of the first interior divider 42. In some embodiments, when the divider 42 is in the closed position, the second rod mount 56 may be slid in a first direction (toward the end 24 of the containment portion) so that the rod 52 pulls the divider toward the open position, until the rod 52 and the divider 42 are fully extended and the rod moves past center and then the rod mount 56 may be moved in a second, opposite direction to cause the rod 52 to push the divider further toward the open position as the rod mount 56 returns to approximately its original position. Moving the divider 42 to the closed position involves a similar process of initially moving the rod mount 56 toward the end 24 until the full extension point is reached, and then reversing the direction of movement of the rod mount 56 until divider reaches the closed position. The rod 52 is preferably located at a vertical level above the divider 42 to provide a clear area for the animal in the compartment.

A second interior divider 46 may be positioned in the interior 28 between the first interior divider 42 and one 25 of the end walls. The second interior divider 46 may thus define a second compartment 45 between the second interior divider 46 and the first interior divider 42, and a third compartment 64 between the second interior divider 46 and the end wall 25. The second interior divider 46 may be similarly mounted for pivot movement in the interior space. A second divider actuation assembly (see FIGS. 3 and 4) may be included to permit the user to open and close the second interior divider from the first end 22 of the compartment portion.

The containment portion 20 may further include a top wall 66 mounted on the side 26, 27 and end 24, 25 walls to define an upper limit of the interior 28. A bottom wall 68 may be mounted on the side 26, 27 and end 24, 25 walls positioned opposite the top wall 66 to define a lower limit of the interior. The bottom wall 68 has an upper surface 70 (see FIG. 4), and that upper surface may form a liquid holding tray. A washout aperture 72 may be formed through the bottom wall to permit fluids to drain through the bottom wall, and a washout plug 74 may be removably mounted in the washout aperture to removably close the aperture (see FIG. 4). Optionally, a mat 75 may be removably positioned on the upper surface of the bottom wall 68, and the mat may have a reticulated or grid structure that permits moisture to move through the mat 75 to the bottom wall, and conversely spaces the animal or gear upward from the upper surface of the bottom wall and any moisture or debris located thereon (see FIGS. 3 and 4).

Optionally, at least one of the side walls 26, 27 may include a plurality of ventilation apertures 76 (see FIG. 1) formed therein to permit air to move through the side wall into the interior 28, and the apertures 76 may be located in the first side wall 26. A slide panel 78 may be mounted on the side wall in which the apertures are formed, and may also have a plurality of apertures formed therein. The slide panel 78 may be slidable with respect to the side wall 26. The plurality of apertures in the slide panel 78 are configured so that at least some of the apertures, and preferably all of the apertures, in the slide panel are alignable in registration with apertures 76 of the first side wall when the slide panel is in a first position. The slide panel 78 may be slidable with respect to the first side wall into a second position. The second position of the slide panel 78 may have at least some (and preferably all) of the apertures of the first side wall being blocked by the slide panel to block air movement through the apertures in the first side wall, and in some embodiments all of the apertures 76 are blocked by the slide panel in the second position.

Figure 2:
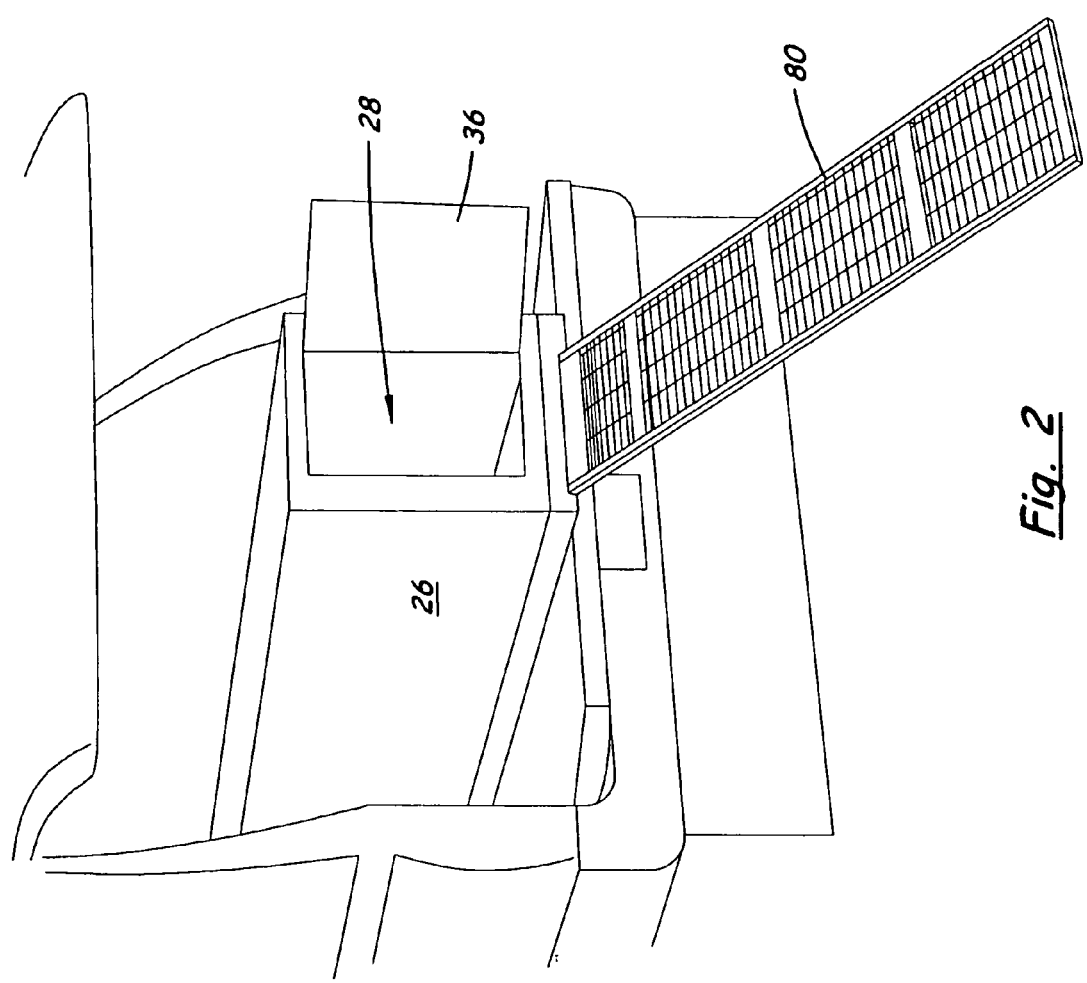
FIG. 2 is a schematic perspective view of the ramp portion of the kennel module in the extended position, according to an illustrative embodiment.

The kennel module 12 may also include a ramp portion 80 that is extendable with respect to the containment portion 20 (see FIG. 2). The ramp portion 80 may be extendable from one of the ends, such as the first end 22, of the containment portion so that the ramp portion is positioned below the first opening 30. The ramp portion 80 may be moveable between a retracted position and an extended position. The ramp portion 80 may be positioned below the interior of the containment portion when in the retracted position. In the extended position, the ramp portion 80 may be pivotable with respect to the containment portion so that an outboard end of the ramp portion may be rested on a ground surface when the system 10 is mounted on the bed of a vehicle that is elevated above the ground surface. Thus, the ramp portion 80 may be extended and pivoted downwardly so that the end of the ramp rests upon the ground surface when the containment portion and base portion are elevated with respect to the ground and located in the cargo space of a vehicle. An animal may thus exit the interior of the containment portion through the first opening 30 and walk down the ramp to the ground surface.

The containment portion 20 of the kennel module 12 may be slidable with respect to the base portion 14, and the portion 20 may thus be moved between a retracted position and an extended position. The retracted position of the containment portion may be characterized by the containment portion being substantially fully positioned over the base portion. The extended position may be characterized by the containment portion being at least partially cantilevered with respect to the base portion so that the compartment portion overhangs, or extends beyond, the base portion. Significantly, this feature permits the compartment portion 20 to be moved in an outward direction with respect to the vehicle while the base portion remains in the cargo space.

The containment portion 20 may be mounted on the track 18 of the base portion to facilitate sliding of the containment portion with respect to the base portion. The ramp portion 80 may be mounted on the containment portion so that the ramp portion moves with the containment portion, such as when the containment portion moves with respect to the base portion 14 to keep the ramp portion below the first opening 30. By this combination of features, the containment portion 20 may be slid outwardly with respect to the base portion 14 to extend through the threshold of the door or gate of the bed of the vehicle, and may by slid over (and beyond, if desired) a tailgate or bumper of the vehicle, so that the ramp clears the tailgate when it is pivoted downwardly.

Figure 5:
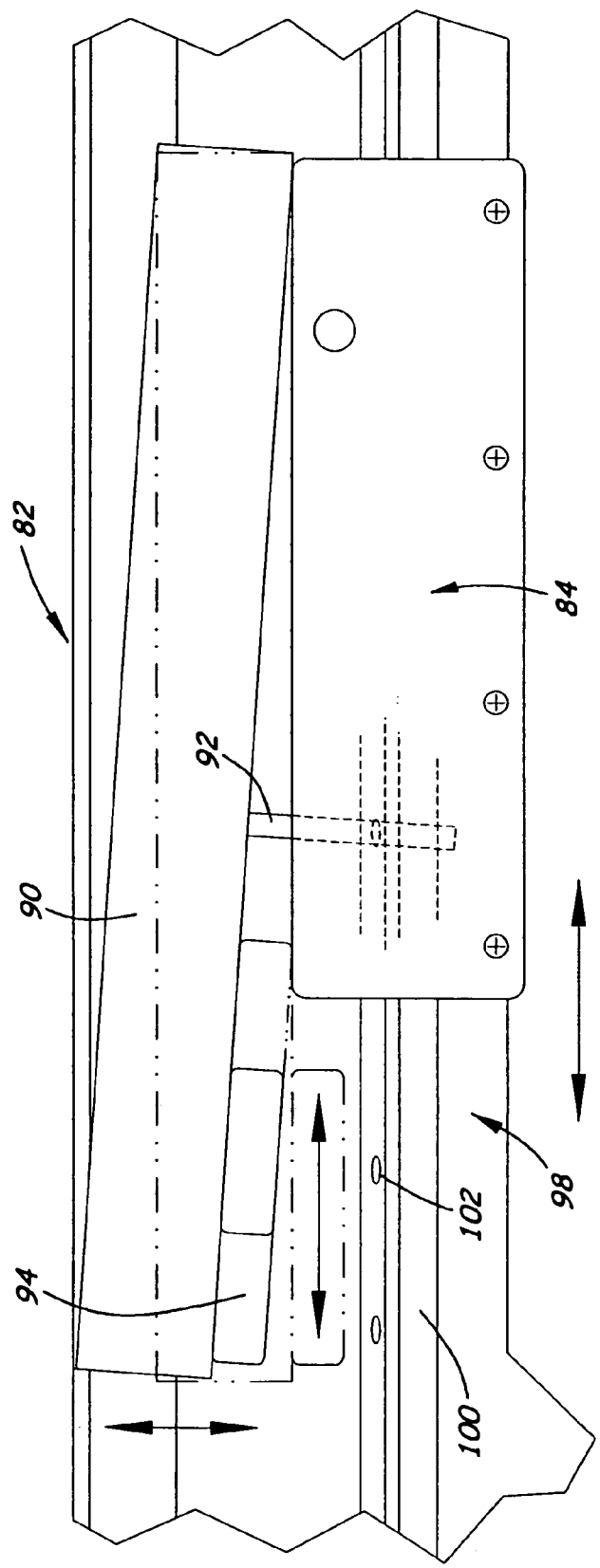
FIG. 5 is a schematic side view of the braking assembly, according to an illustrative embodiment of the disclosure.

The kennel module 12 may also include a braking assembly 82 configured to selectively lock the containment portion in a selected position with respect to the base portion, so that the containment portion may be locked, for example, at a position at or between the retracted and extended positions of the containment portion (see FIGS. 5 and 6). The braking assembly 82 may comprise a primary structure 84 that is mounted on a first portion of the kennel module 12, and a secondary structure 98 that is mounted on a second portion of the kennel module. The first portion may be either the base portion 14 or the containment portion 20, and the second portion may be the other one of the base portion and the containment portion. In the illustrative embodiment, the primary structure 84 is mounted on the base portion 14 and the secondary structure 98 is mounted on the containment portion 20, although this relationship is not required.

The primary structure 84 may include a channel member 88 that defines a slot 86. The primary structure 84 may also include a handle member 90 that is movably mounted on the channel member 88. The handle member 90 may be pivotally mounted on the channel member 88, and may be movable between a release position (shown in solid lines in FIG. 5) and an engage position (shown in broken lines in FIG. 5). The primary structure 84 may also include an interlock member 92 mounted on the handle member 90 so as to move with the handle member as the handle member moves between the release and engage positions. The primary structure 84 may further include an unlock hold member 94 configured to selectively block the handle member 90 from moving into the engage position. The unlock hold member 94 may be movable between a block position (shown in solid lines in FIG. 5) and an unblock position (shown in broken lines in FIG. 5) with respect to the handle member 90. The unlock hold member 94 may be slidably mounted on the handle member 90 to permit sliding of the unlock hold member between the block and unblock positions.

The secondary structure 98 may be movable in the slot 86 defined by the primary structure 84. The secondary structure 98 may comprise a rail 100 that is movable in the slot 86 with respect to the primary structure. At least two, and preferably more, apertures 102 may be formed in the rail 100. The apertures 102 may removably receive the interlock member 92 when the handle member 90 is in the engage position, and the interlock member may be free of the apertures 102 when the handle member is in the release position. The handle member 90 may thus be moved into the engage position to move the interlock member 92 into one of the apertures 102 in the rail, thus holding the primary and secondary structures in the selected position and also holding the base portion and the containment portion in the corresponding position. The handle member 90 may be moved out of the engage position to thereby move the interlock member out of the aperture to release the braking assembly and permit the containment portion to generally move freely with respect to the base portion. The unlock hold member 94 blocks the handle member from being moved into the engage position, and thus from moving the interlock member into one of the apertures to thereby lock the positions of the base and containment portions, when such a braking or locking relationship is not intended.

In some embodiments of the containment portion 20, and other modules described below, a top perimeter wall 104 extends upwardly and about the top wall to limit movement of objects positioned on the top wall 66 of the containment portion (see FIG. 1). The top perimeter wall 104 may comprise a plurality of upper wall segments that are positioned along a perimeter of the top wall and that extend upwardly from the top wall. The upper wall segments may be removable from the module.

Figure 7:
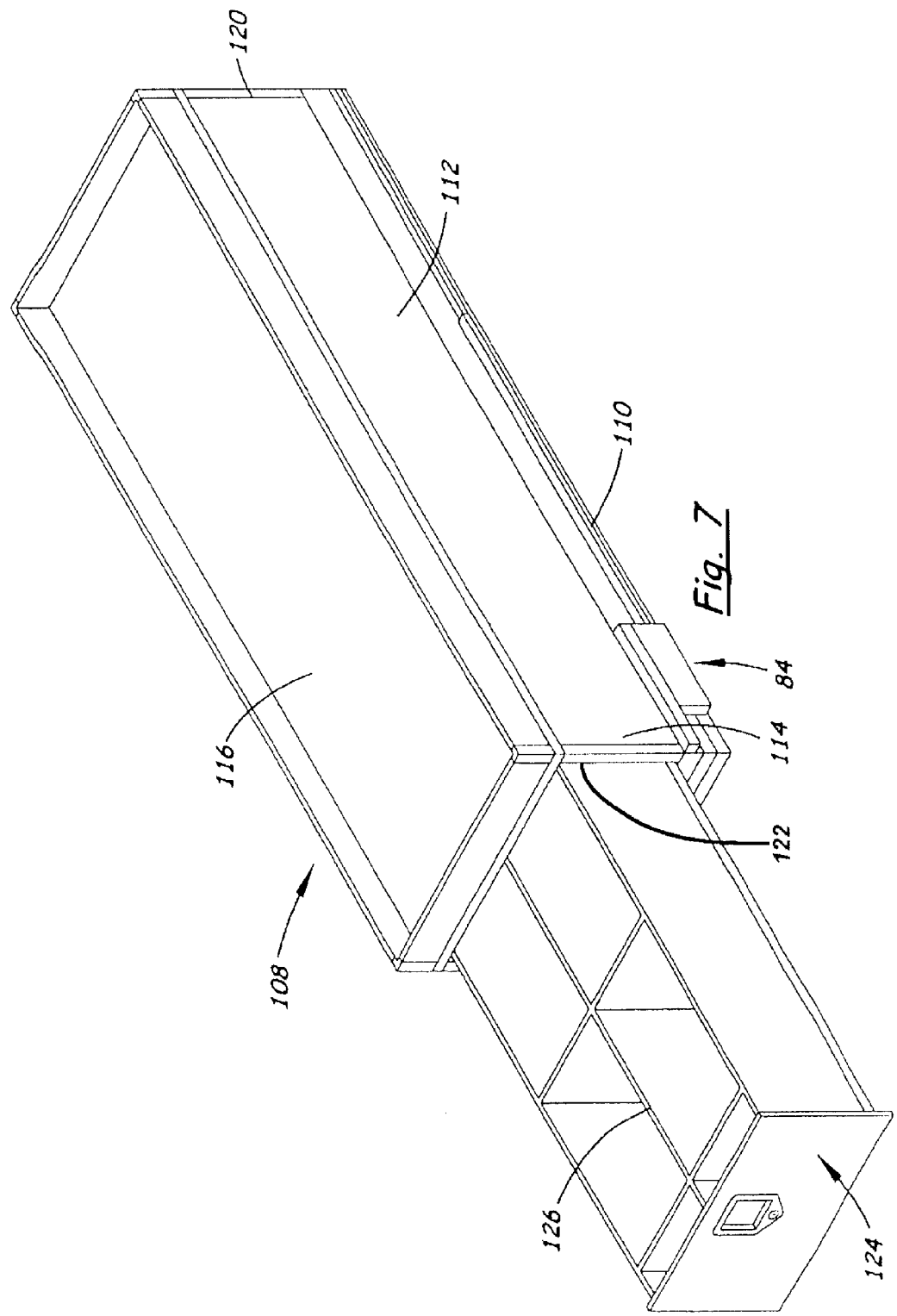
FIG. 7 is a schematic perspective view of the vault storage module, according to an illustrative embodiment.

In another aspect of the system 10, a vault storage module 108 is provided for convenient storage of items of gear (see FIG. 7). Similar to the kennel module, the vault storage module may be rested or mounted in the cargo space of the vehicle. The vault storage module 108 may comprise a base portion 110 and a housing portion 112 that is longitudinally slidable with respect to the base portion. The housing portion may define an interior, and may include a pair of side walls 114, a top wall 116, a bottom wall, and at least one end wall 120. An opening 122 may be defined on one end of the housing portion 112 that is located opposite of the end wall 120. The vault storage module 108 may also include a drawer portion 124 that is mounted on the housing portion 112 and is slidable with respect to the housing portion 112 to move inwardly into and outwardly of the interior of the housing portion. The drawer portion may comprise a plurality of peripheral walls that include a front wall and define an interior of the drawer portion. The drawer portion may also include at least one compartment wall 126 for dividing the interior of the drawer portion into at least two compartments.

The vault storage module 108 may also include a braking assembly similar to that described above for restricting movement of the housing portion 112 with respect to the base portion 110.

Figure 8:
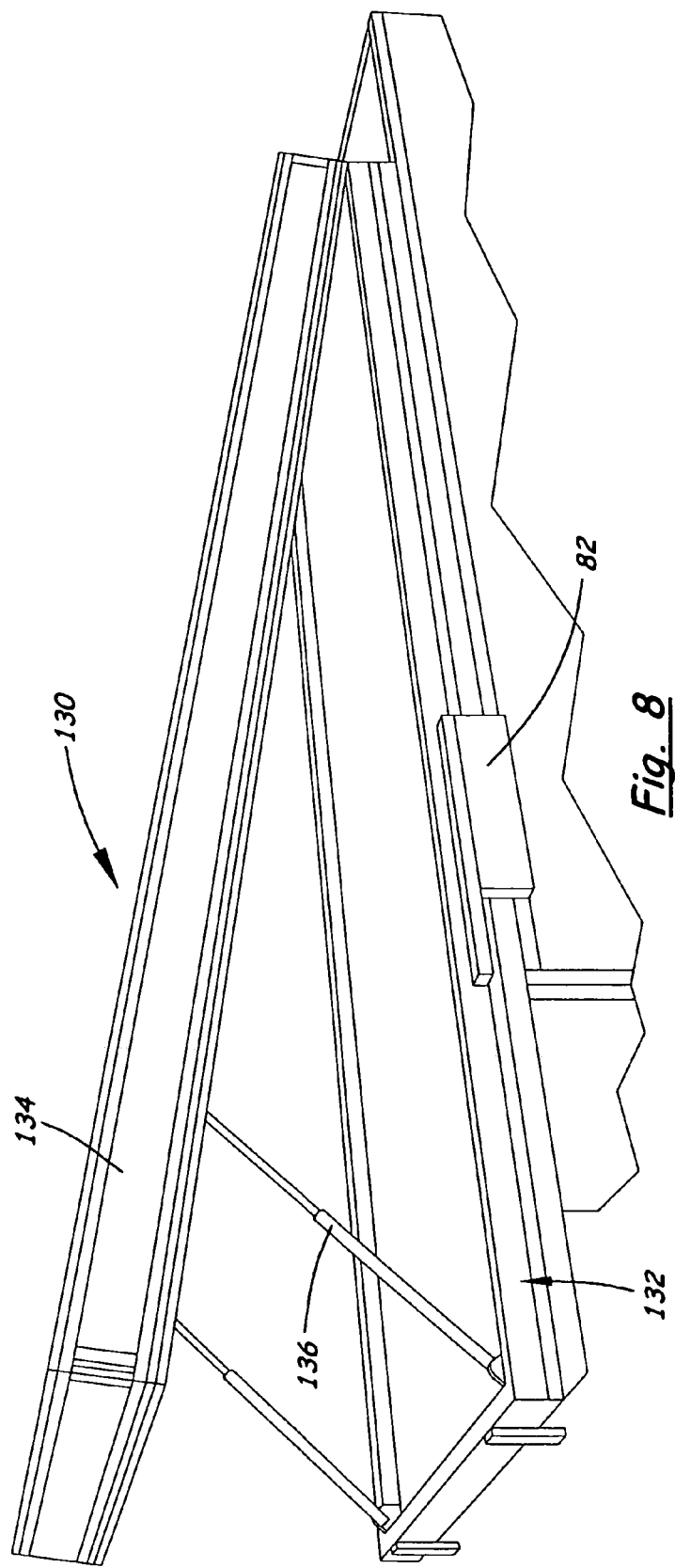
FIG. 8 is a schematic perspective view of the lid storage module, according to an illustrative embodiment of the disclosure.
Figure 10:
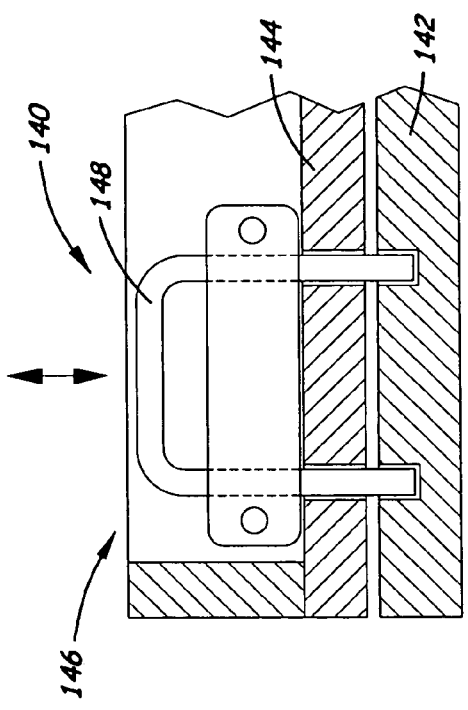
FIG. 10 is a schematic sectional view taken along line 10-10 of FIG. 9 of the glide storage module.
Figure 11:
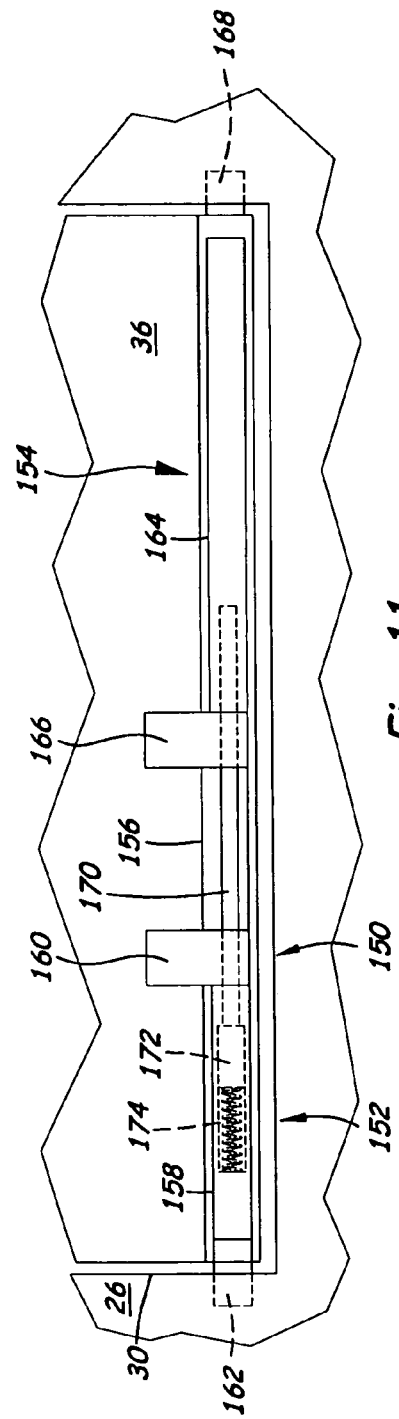
FIG. 11 is a schematic partial side view of a door and wall of the containment portion of the kennel module showing an embodiment of a latching assembly.
Figure 14:
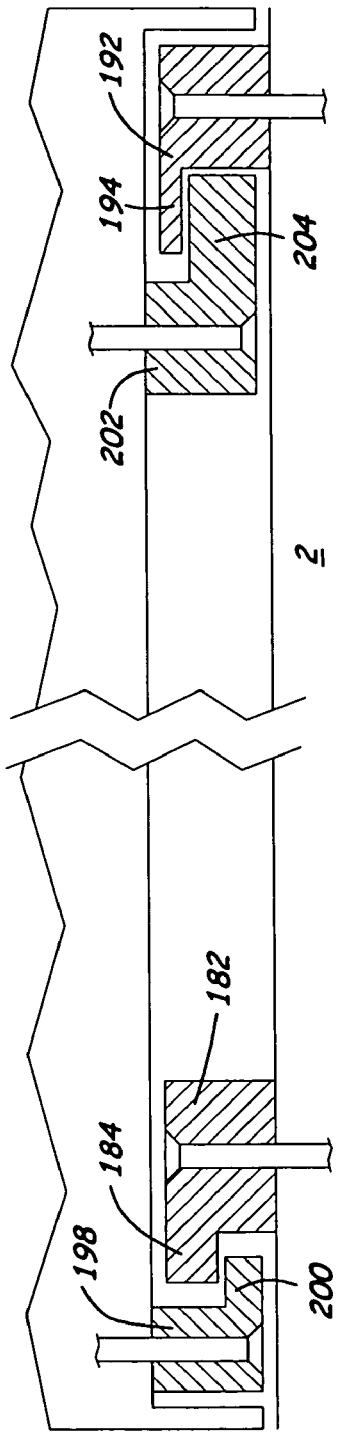
FIG. 14 is a schematic side sectional view of a bottom of one of the modules and the bed showing the interlocking condition of the elements of the securing assembly at a location spaced from a central longitudinal axis of the module.
Figure 15:
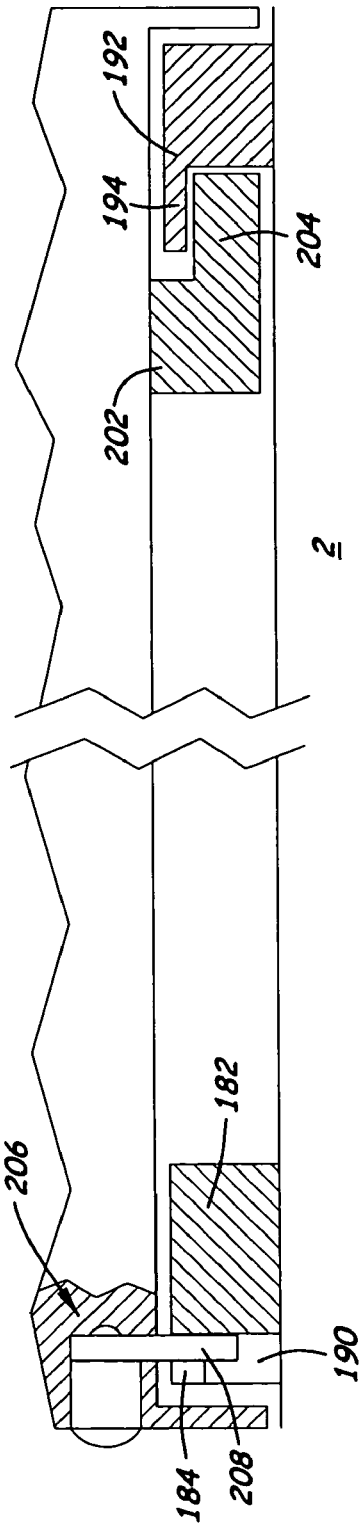
FIG. 15 is a schematic side sectional view of the bottom of a module and the bed showing the interlocking condition of the elements of the securing assembly at a central longitudinal axis of the module.

The system 10 may also include a lid storage module 130 that is configured to be positioned on top of another module, such as the kennel module or the vault storage module, although use with another module is not required (see FIG. 8). The lid storage module 130 may be elongate with opposite ends, and may be slidable with respect to the other module on which it is mounted. The lid storage module 130 may comprise a tray portion 132 and a lid portion 134. The tray portion 132 may have an upper surface for resting objects thereon. The tray portion 132 may be slidably mountable on another module to permit slidable movement of the tray portion with respect to the other module on which the lid storage module is mounted. The lid portion 134 may be mounted on and positioned above the tray portion. The lid portion 134 may be pivotable with respect to the tray portion 132, and may be pivotally mounted on the tray portion. It should be recognized that the lid portion 134 may be pivotally mounted to the tray portion 132 along a relatively shorter side (or end) of the lid storage module 130 or a relatively longer side of the module 130. Illustratively, in FIG. 8, the lid portion 134 and the tray portion 132 are hinged together at corresponding ends of the lid portion and tray portion of the lid storage module 130. The lid storage module 130 may also include a lift assist assembly 136 that is configured to provide assisting lift force to bias the lid portion away from the tray portion. The lift assist assembly 136 may be mounted on the tray portion and the lid portion, and extend therebetween. In the illustrative embodiment, the lift assist assembly 136 comprises a pair of pressurized piston and cylinder arrangements.

The system 10 may also include a glide storage module 140 for positioning on the top of another module (such as, for example, the containment portion 20) or optionally may be rested on the bed surface of the cargo space of a vehicle (see FIGS. 1 and 9). The glide storage module 140 may be elongate in shape. The glide storage module 140 may comprise a mount portion 142 configured to rest on or be integrated into the top of another module (or rest on the bed surface of the cargo space), and a platform portion 144 that is mounted on the mount portion 142. The platform portion 144 may be slidable with respect to the mount portion 142 in a manner similar to the base portions and main portions of other modules of this disclosure, and thus may be movable between a retracted position in which the platform portion substantially completely overlies the mount portion, and an extended position in which the platform portion is extended beyond the mount portion. The platform portion 144 may be slidable along a longitudinal axis of the glide storage module. The glide storage modules 140 may also be selectively lockable in the retracted position by a platform lock assembly 146 (see FIG. 10). The platform lock assembly 146 may include a loop 148 that may be lifted upwardly to release the lock assembly and allow the platform portion to move from the retracted position toward the extended position. The loop 148 may be spring-loaded and biased toward a locked condition and may operate as a slam latch that moves to the lock position when the platform portion 144 is moved into the retracted position. Illustratively, the loop 148 may have free ends that extend through the platform portion 144 and into holes in the mount portion 142 to resist relative movement of the platform portion with respect to the mount portion. Pulling or lifting the loop upward may remove the ends of the loop 148 from the holes in the mount portion 142 to allow movement of the platform portion 144 relative to the mount portion 142.

Each of the doors of the containment portion 20 may include a latch assembly 150 for securing the respective door in the closed position until the latch assembly is released. In one illustrative embodiment, shown in FIGS. 11 and 12, the latch assembly 150 includes an upper slide structure 152 and a lower slide structure 154 that are mounted on a track 156 and are movable toward each other on the track to withdraw a slug or bolt from a mortise formed on the wall on which the door is mounted. The upper slide structure 152 of the latch assembly 150 includes an upper body member 158 slidably mounted on the track 156, an upper handle 160 mounted on the upper body member 158 such that force applied to the upper handle 160 is transferred to the upper body member, and an upper bolt 162 mounted on the upper body member 158 so that the upper bolt moves with the upper body member. Similarly, but not necessarily identically, the lower slide structure 154 of the latch assembly 150 includes a lower body member 164 slidably mounted on the track 156, a lower handle 166 mounted on the lower body member 164 such that force applied to the lower handle 166 is transferred to the lower body member, and a lower bolt 168 mounted on the lower body member 164 so that the lower bolt moves with the lower body member. A guide rod 170 may extend between and extend into a bore formed in each of the upper 158 and lower 164 body members and at least one of the body members may slide along the guide rod as the upper 152 and lower 154 slide structures are moved toward each other. In one of the body members, illustratively the upper body member 158, the guide rod 170 contacts a slide block 172 positioned in the bore, which in turn is acted upon by a spring 174 that pushes against the slide block and the slide block pushes against the guide rod, which is pushed toward the lower body member 164 and contacts a blind end of the bore in the lower body member, pushing the upper and lower slide structures away from each other. The spring 174, slide block 172 and guide rod 170 tend to bias the upper slide structure 152 and the lower slide structure 154 away from each other to hold the upper 162 and lower 168 bolts into the respective mortises in the wall. When the upper handle 160 and the lower handle 166 are pinched or pushed toward each other, the guide rod 170 and the slide block 172 compress the spring 174 and pull the upper 162 and lower 168 bolts out of the mortises. Optionally, but preferably, the slide block 172 includes a hole 176 formed therethrough that is aligned with an aperture 178 in the upper body member 158 when the upper and lower bolts engage the respective mortises in the wall, and thus when the shackle of a lock is inserted through the aligned aperture 178 and hole 176, movement of the slide block 172 and the guide rod 170 is prevented and the bolts 162, 168 are not removable from the mortises in the wall, and the latch assembly 150 prevents the door from being opened. Removal of the shackle from the aperture 178 and the hole 176 allows the bolts 162, 168 to be moved out of the mortises.

The system 10 may further include a securing assembly 180 for releasably securing one of the modules to the bed 2 of the vehicle, or other surface. The securing assembly 180 may include a first anchor element 182 mountable at a first location on the bed that corresponds to a desired location for the front or first end of the module. The first anchor element 182 may have a first shoulder projection 184 oriented toward a first end of the first anchor element and may have a second shoulder projection 186 toward a second end of the first anchor element. The first anchor element 182 may have a tapered width toward the first end and the second end thereof. Each of the ends may have a taper edge 188. The first shoulder projection 184 may be located on the taper edge 188 on the first end and the second shoulder projection 186 may be located on the taper edge 188 on the second end. The first anchor element 182 may have a lock engaging recess 190 located toward a middle of the first anchor element.

The securing assembly 180 may also include a second anchor element 192 mountable at a second location on the bed corresponding to a desired location for a rear or second end of the module. The second anchor element 192 may have a third shoulder projection 194 for orienting toward the first anchor element 182. The securing assembly 180 may further comprise a first interlock element 198 mounted on the module for releasably engaging the first anchor element 182. The first interlock element 198 may be located on a bottom of the module, and may comprise a pair of first interlock elements 198, 199. The pair of first interlock elements may be positioned at laterally spaced locations on the module. Each of the first interlock elements 198, 199 may have a first interlock shoulder projection 200 that is configured to engage the respective first shoulder projection 184 and second shoulder projection 186.

The securing assembly 180 may further include a second interlock element 202 that is mounted on the module located for releasably engaging the second anchor element 192, and may be located on the bottom of the module. The second interlock element 202 may have a second interlock shoulder projection 204 configured to engage the third shoulder projection 194 of the second anchor element 192. The securing system 180 may also include a lock assembly 206 mounted on the module, and may be mounted on the front or first end of the module. The lock assembly 206 may have a lever 208 that is selectively engagable with the lock engaging recess 190 of the first anchor element 182. The lever 208 of the lock assembly may have a locked position configured to engage the lock engaging recess 190 and an unlocked position in which the lever is configured to be free of engagement with the lock engaging recess. When the lever 208 is in the locked position and engaged with the lock engaging recess, forward and rearward movement of the module with respect to the first anchor element 182 may be resisted. As a result, the locked position of the lever 208 may hold the first shoulder projection 184 of the first anchor element 182 in engagement with the first interlock shoulder projection 200 of the first interlock element 198, 199, and the third shoulder projection 194 of the second anchor element 192 in engagement with the second interlock shoulder projection 204 of the second interlock element 202. Conversely, moving the lever 208 to the unlocked position permits forward and rearward movement of the module with respect to the first anchor element 182, and permits the interlock shoulder projections 200, 204 of the interlock elements 198, 199 and 202 to be disengaged from the shoulder projections 184, 186 and 194 of the anchor elements 182 and 192.

The system 10 may also include an adjustable limiting assembly 196 that is mounted on the track 18 (see FIG. 18) and sets an adjustable limit of the movement of, for example, the containment portion 20 with respect to the base portion 14. The limiting assembly 196 may be slidably moveable along the track 18 and may be selectively lockable in different positions along the track. The locking may be accomplished, for example, by a spring-loaded pin of the limiting assembly that is able to engage one of multiple holes formed into the track, so that the pin is biased to extend into one of the holes in the track when the pin is aligned with the hole. The pin may be released from the hole by pulling on a ring on the pin against the bias of the spring. The limiting assembly 196 thus blocks movement of the containment portion 20 past the position of the limiting assembly on the track.

Figure 16:
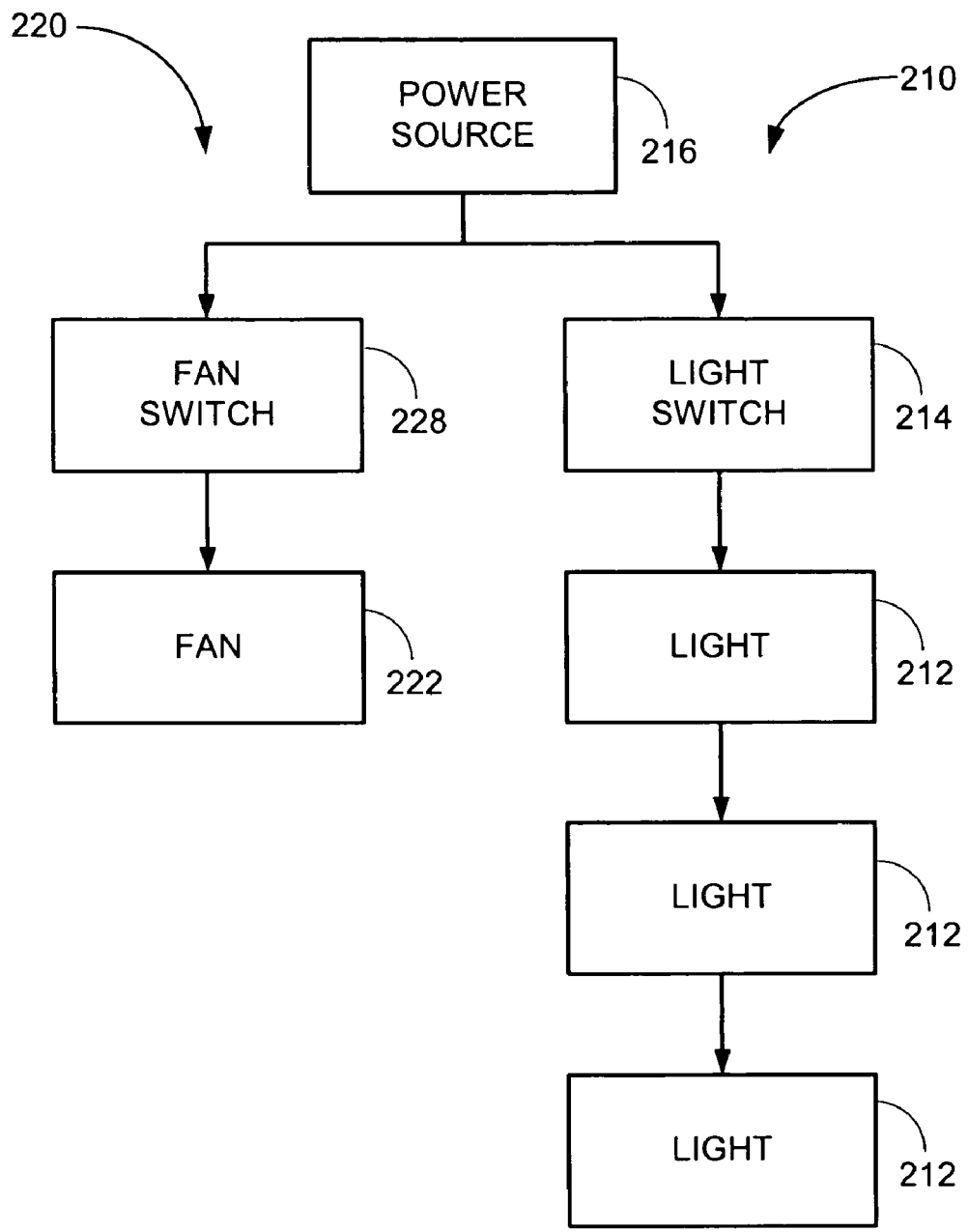
FIG. 16 is a schematic block diagram showing elements of the ventilation assembly and lighting assembly of the system.
Figure 17:
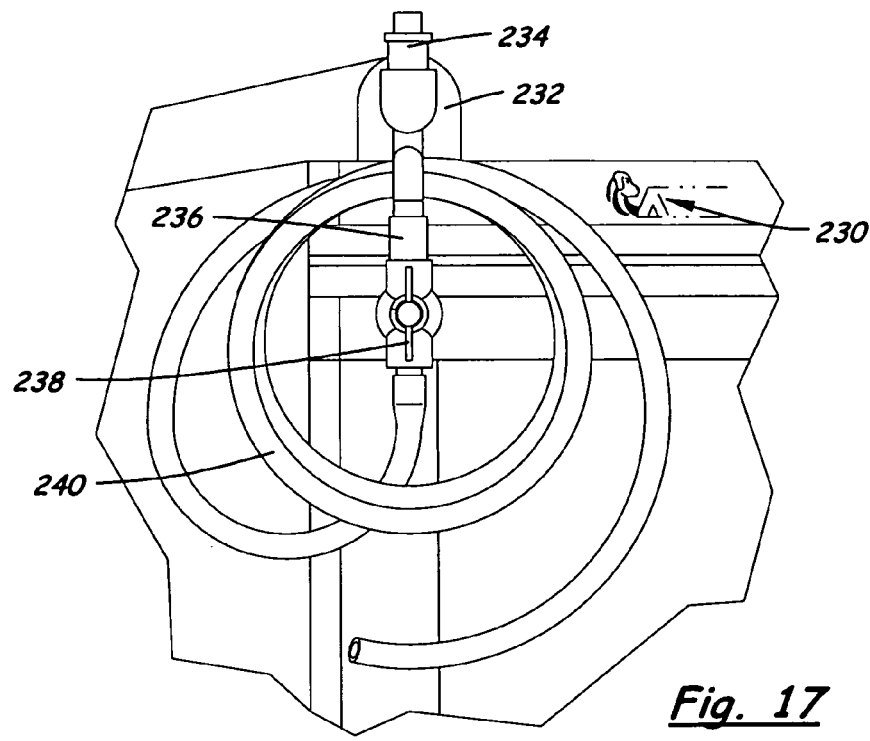
FIG. 17 is a schematic end view of the portion of a module showing an optional watering assembly of the system.
Figure 18:
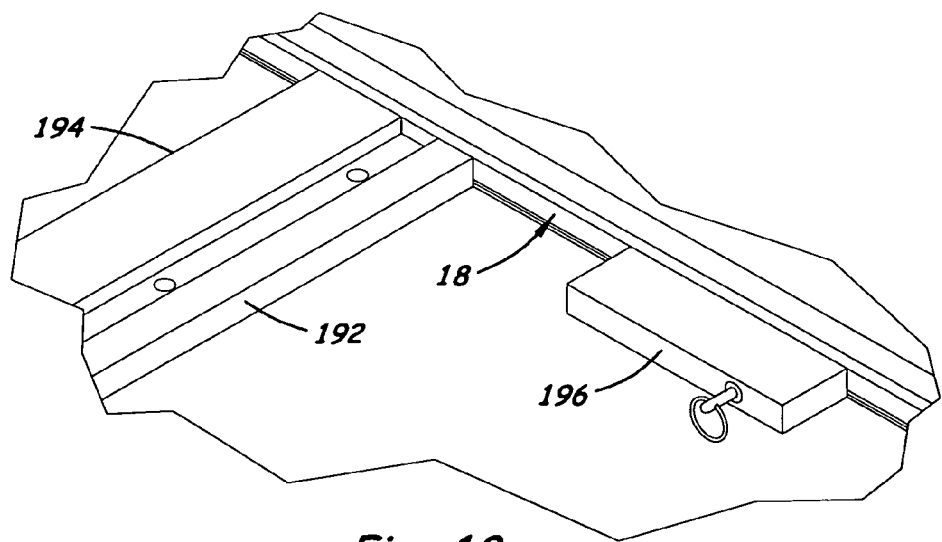
FIG. 18 is a schematic perspective view of the adjustable limiting assembly of the system.

As a further option, the containment portion 20 may include a lighting assembly 210 for illuminating the interior 28 of the containment portion. The lights 212 of the illumination assembly 210 may be of any suitable type and may be positioned at various locations in the interior, as is shown in FIG. 16. The lighting assembly 210 may include a switch 214 that selectively supplies power to the lights 212 from a power source 216, such as a battery or a connection to the power system of the vehicle.

Figure 3:
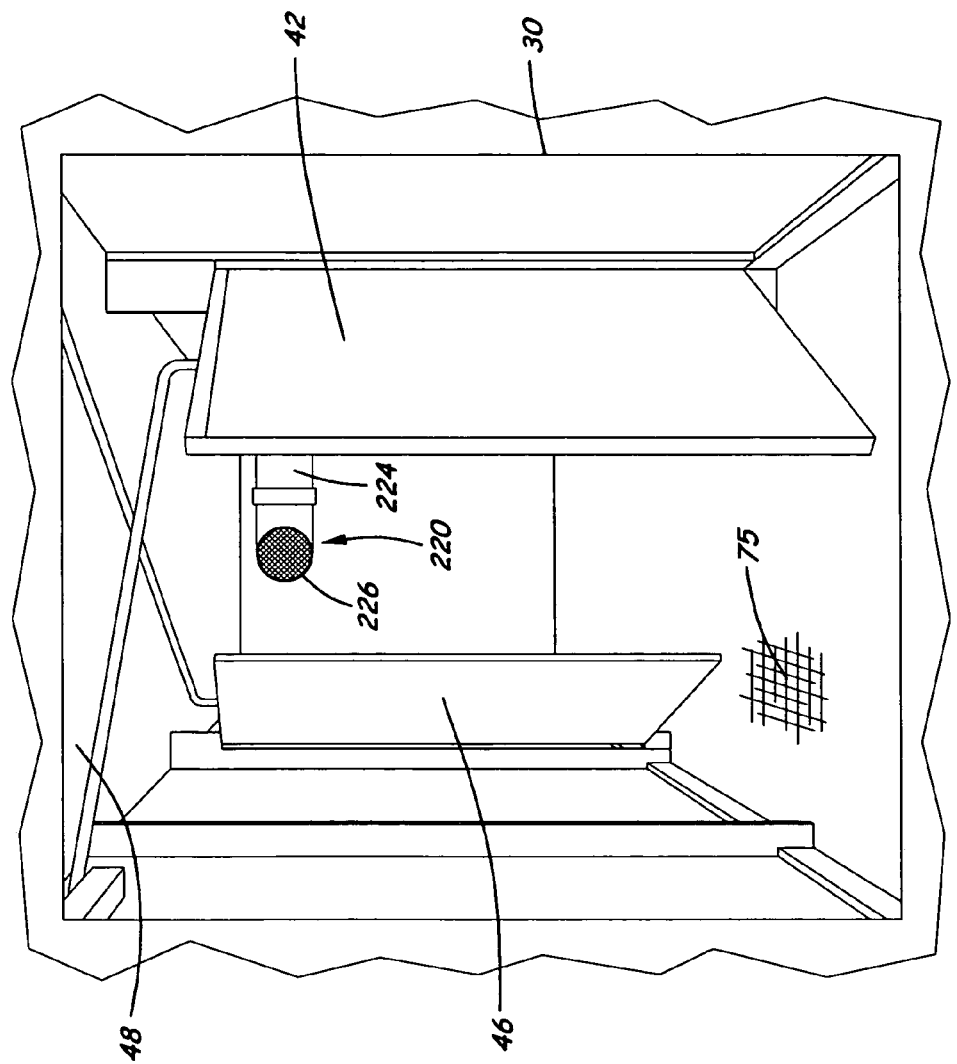
FIG. 3 is a schematic perspective view of the interior of the compartment portion, according to an illustrative embodiment.

As another option, the containment portion 20 may include a ventilation assembly 220 for moving air into (and optionally out of) the interior 28 of the containment portion (see, for example, FIGS. 1, 3 and 16). The ventilation assembly 220 may include a fan 222 and a duct 224 having one end in communication with an opening 225 on one of the walls of the containment portion 20 and another end 226 positioned in the interior 28. The ventilation 220 may include a switch 228 that selectively supplies power to the fan 222 from the power source 216.

The system 10 may also include a watering assembly 230 for holding and dispensing water (or other liquid) in association with one of the modules. The watering assembly 230 may include a tank structure 232 that is positionable on and securable to a module, such as is illustratively shown in FIG. 17. The tank structure 232 may have a closed interior with a fill structure 234 and a drain structure 236, which may be conveniently located toward or at one of the ends of the tank structure 232. The fill structure 234 may include a fill conduit and may be sealed with a removable cap between fillings. The drain structure 236 may include a drain conduit which may have a valve 238 integrated therewith to selectively allow and prevent fluid flow through the drain conduit. A length of relatively flexible conduit 240 may be included with the drain structure 236, and may be in fluid communication with the drain conduit.

Aspects of the system of the disclosure are disclosed in the description and related drawings directed to specific embodiments of the disclosure. Alternate embodiments may be devised without departing from the scope of the disclosure. Additionally, well-known elements of the system of the disclosure have not been described in detail or will be omitted so as not to obscure the relevant details of the disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

The following claims reflect inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects. Further, where the term "substantially" is used, it is intended to mean "for the most part" or "being largely but not wholly that which is specified".

I claim:

1. An animal and gear transportation system for positioning in a cargo space of a vehicle, the system comprising:
    a kennel module for receiving an animal, the kennel module including:
        a base portion restable on a bed of the cargo space, the base portion being elongate with opposite ends; and
        a containment portion mounted on the base portion, the containment portion being elongate with opposite ends and sides extending between the ends;
    wherein the containment portion is slidable with respect to the base portion such that the containment portion is movable between a retracted position in which the containment portion is substantially fully positioned over the base portion, and an extended position in which the containment portion is at partially cantilevered with respect to the base portion; and
    wherein the containment portion includes walls defining a confining interior capable of receiving an animal, said walls including side walls at the sides, a bottom wall, and a top wall forming a closed top opposite of the bottom wall, said walls being movable as a unit with respect to the base portion between said positions such that said walls form the confining interior in each of said positions; and
    wherein the kennel module additionally comprises a ramp portion slidably extendable from and retractable into one end of the containment portion.

2. The system of claim 1 wherein the containment portion is slidable in a longitudinal direction with respect to the base portion.

3. The system of claim 1 wherein the containment portion includes a first opening in an end wall of the elongated containment portion for access to the interior, and a first door being mounted on the end wall of the containment portion and being movable to selectively close the first opening.

4. The system of claim 3 additionally comprising a latching assembly configured to releasably latch the door in a closed position.

5. The system of claim 1 additionally comprising a first interior divider located in the interior of the containment portion and configured to selectively define a compartment on each side of the first interior divider when in a closed position, the first interior divider being pivotably movable to an open position to permit movement between the compartments on either side of the first interior divider;
    wherein the open position of the first interior divider is characterized by the divider being oriented substantially parallel to one of the side walls, the closed position of the first interior divider defining a first compartment located toward a first longitudinal end of the elongated containment portion and a second compartment located toward a second longitudinal end of the elongated containment portion.

6. The system of claim 5 wherein the first interior divider is located between a first opening in a perimeter wall of the containment portion and a second opening in the perimeter wall of the containment portion such that the first opening is in communication with the first compartment and the second opening is in communication with the second compartment.

7. The system of claim 1 additionally comprising a first interior divider located in the interior of the containment portion and configured to selectively define a compartment on each side of the first interior divider when in a closed position, the first interior divider being movable to an open position to permit movement between the compartments on either side of the first interior divider; and
    wherein the first interior divider is spaced from an upper interior surface of the top wall of the containment portion to create an air passage around the divider when the divider is in the closed position.

8. The system of claim 1 additionally comprising a first interior divider located in the interior of the containment portion and configured to selectively define a compartment on each side of the first interior divider when in a closed position, the first interior divider being movable to an open position to permit movement between the compartments on either side of the first interior divider; and wherein the first interior divider is pivotable about a vertical axis and the closed position is characterized by the first interior divider extending between and substantially perpendicular to the side walls of the containment portion.

9. The system of claim 1 additionally comprising a first interior divider located in the interior of the containment portion and configured to selectively define a compartment on each side of the first interior divider when in a closed position, the first interior divider being movable to an open position to permit movement between the compartments on either side of the first interior divider; and a first divider actuator assembly at least partially located in the interior of the containment portion, the actuator assembly being configured to move the first interior divider between the open position and the closed position.

10. The system of claim 9 wherein the first divider actuator assembly is positioned closer to an end of the containment portion than the first interior divider such that a user may actuate the actuator assembly from a location adjacent to the end of the containment portion without reaching the first interior divider.

11. The system of claim 1 additionally comprising a first interior divider located in the interior of the containment portion and configured to selectively define a compartment on each side of the first interior divider when in a closed position, the first interior divider being movable to an open position to permit movement between the compartments on either side of the first interior divider;

wherein the containment portion includes a first opening in an end wall for access to the interior, and a first door being mounted on the end wall of the containment portion and being positionable to selectively close the first opening;

wherein the containment portion includes a second opening in one of the side walls for access to the interior, and a second door being mounted on said side wall and being positionable to selectively close the second opening; and wherein, when the first interior divider is in the closed position, the first opening provides access to a first one of the compartments and the second opening provides access to a second one of the compartments.

12. The system of claim 1 additionally comprising a first interior divider located in the interior of the containment portion and configured to selectively define a compartment on each side of the first interior divider when in a closed position, the first interior divider being pivotably movable to an open position to permit movement between the compartments on either side of the first interior divider, the closed position of the first interior divider defining a first compartment located toward a first longitudinal end of the elongated containment portion and a second compartment located toward a second longitudinal end of the elongated containment portion; and a second interior divider positioned in the interior of the containment portion between the first interior divider and an end of the containment portion to define the second compartment between the second interior divider and the first interior divider, and a third compartment between the second interior divider and the end wall.

13. The system of claim 12 wherein the containment portion includes a third opening positioned in one of the side walls of the containment portion for access to the third compartment, and a third door mounted on the side wall and being positionable to selectively close the second opening.

14. The system of claim 1 wherein the containment portion has a perimeter wall including a first one of the side walls extending between ends of the containment portion; and wherein the first side wall includes a plurality of apertures formed therein to permit air to move through the first side wall into the interior.

15. The system of claim 14 additionally comprising a slide panel mounted on the at least one side wall and having a plurality of apertures formed therein, the slide panel being movable with respect to the first side wall, the plurality of apertures in the slide panel being configured such that at least some of the apertures in the slide panel are alignable in registration with apertures of the first side wall in a first position of the slide panel, the slide panel being movable with respect to the first side wall into a second position, the second position being characterized by at least some of the apertures of the first side wall being blocked by the slide panel to block air movement through the apertures in the first side wall.

16. The system of claim 1 wherein the kennel module additionally comprises a ramp portion being extendable from one of the ends of the containment portion to permit an end of the ramp portion to contact a ground surface below the containment portion; and wherein the ramp portion is mounted on the containment portion for movement with the containment portion.

17. The system of claim 1 wherein the kennel module additionally comprises a ramp portion extendable with respect to the containment portion from one of the ends of the containment portion; and wherein the ramp portion is moveable between a retracted position in the bottom wall of the containment portion and an extended position extended out of the bottom wall, the ramp portion being pivotable with respect to the containment portion when the ramp portion is in the extended position.

18. The system of claim 1 additionally comprising a braking assembly for selectively locking a selected position of the containment portion with respect to the base portion.

19. The system of claim 1 additionally comprising a top perimeter wall extending upwardly and about a top wall of the containment portion to limit movement of objects positioned on an upper surface of the containment portion.

20. The system of claim 1 wherein the bottom wall defines a lower limit of the interior, the bottom wall having an upper surface, the upper surface of the bottom wall forming a liquid holding tray, a washout aperture being formed through the bottom wall to permit fluids to drain through the bottom wall, and a washout plug being removably mounted in the washout aperture for removably closing the aperture.

21. The system of claim 1 additionally comprising a lighting assembly configured to illuminate the interior of the containment portion.

22. The system of claim 1 additionally comprising a ventilation assembly configured to move air through the interior of the containment portion.

23. The system of claim 1 additionally comprising a securing assembly configured to releasably secure the module to a bed of the cargo space.

24. The system of claim 1 additionally comprising a watering assembly configured to hold a fluid on the module, the watering assembly dispensing the fluid from the watering assembly.

25. The system of claim 1 wherein the top wall of the containment portion is fixed in position to the side walls and the bottom wall.

26. The system of claim 1 wherein the kennel module additionally comprises a ramp portion being extendable from one of the ends of the containment portion to permit an end of the ramp portion to contact a ground surface below the containment portion, the ramp portion being configured such that an animal is able to walk on the ramp portion to an end and onto the ground surface.

27. An animal and gear transportation kennel for positioning in a cargo space of a vehicle, the kennel comprising:

- a base portion restable on a bed of the cargo space, the base portion being elongate with opposite ends; and
- a containment portion mounted on the base portion, the containment portion being elongate with opposite ends and sides extending between the ends, the containment portion including walls defining a confining interior capable of receiving an animal, said walls including side walls at the sides, ends walls at the ends, a bottom wall extending to the side and end walls, and a top wall extending to the side and end walls to form a closed top opposite of the bottom wall, a first opening being formed in one of the end walls of the elongated containment portion for access to the interior, a first door being mounted on the end wall of the containment portion and being movable to selectively close the first opening, a second opening in one of the side walls of the containment portion and a second door being mounted on the side wall and being positionable to selectively close the second opening;
- a first interior divider located in the interior of the containment portion and configured to selectively define a compartment on each side of the first interior divider when in a closed position, the first interior divider being pivotably movable to an open position to permit movement between the compartments on either side of the first interior divider, the first interior divider being located between the first opening and the second opening such that the first opening is in communication with the first compartment and the second opening is in communication with the second compartment when the interior divider is in the closed position;
- wherein the containment portion is slidable with respect to the base portion such that the containment portion is movable between a retracted position in which the containment portion is substantially fully positioned over the base portion, and an extended position in which the containment portion is at partially cantilevered with respect to the base portion; and
- wherein said walls are movable as a unit with respect to the base portion between said positions such that said walls form the confining interior in each of said positions; and
    - wherein the kennel module additionally comprises a ramp portion slidably extendable from and retractable into one end of the containment portion.

\* \* \* \* \*